(12) United States Patent
Odlén

(10) Patent No.: US 11,916,693 B2
(45) Date of Patent: Feb. 27, 2024

(54) SMART HOME SYSTEM AND CONTROLLING OF THE SAME

(71) Applicant: Inter IKEA Systems B.V., LN Delft (NL)

(72) Inventor: Ingrid Odlén, Malmö (SE)

(73) Assignee: INTER IKEA SYSTEMS B.V., Ln Delft (NL)

( * ) Notice: Subject to any disclaimer, the term of this patent is extended or adjusted under 35 U.S.C. 154(b) by 0 days.

(21) Appl. No.: 17/572,335

(22) Filed: Jan. 10, 2022

(65) Prior Publication Data

US 2022/0224558 A1 Jul. 14, 2022

(30) Foreign Application Priority Data

Jan. 11, 2021 (EP) .................................... 21150969
Mar. 16, 2021 (EP) .................................... 21162963

(51) Int. Cl.
*H04L 12/28* (2006.01)
*G05B 15/00* (2006.01)
(Continued)

(52) U.S. Cl.
CPC .......... *H04L 12/2818* (2013.01); *G05B 15/02* (2013.01); *G08B 15/002* (2013.01);
(Continued)

(58) Field of Classification Search
CPC ............. H04L 12/2818; H04L 12/2825; H04L 2012/285; H04L 12/2803; G08B 15/002;
(Continued)

(56) References Cited

U.S. PATENT DOCUMENTS

| | | | | |
|---|---|---|---|---|
| 2014/0281472 A1* | 9/2014 | Yalamanchili | ...... | G06F 15/7867 713/100 |
| 2015/0082225 A1* | 3/2015 | Shearer | ............... | H04L 12/2803 715/771 |

(Continued)

FOREIGN PATENT DOCUMENTS

EP    2431956 A1    3/2012

OTHER PUBLICATIONS

PCT International Search Report and Written Opinion for PCT Application No. PCT/EP2022/050336 dated Mar. 17, 2022 (15 pages).

(Continued)

*Primary Examiner* — Austin J Moreau
*Assistant Examiner* — Chhian (Amy) Ling
(74) *Attorney, Agent, or Firm* — Merchant & Gould P.C.

(57) ABSTRACT

A method (100) for controlling a plurality of devices (10) of a smart home system (20) is provided. The method (100) comprises: switching (S110) the smart home system (20) between a home mode (21) and an away mode (22); and upon the smart home system (20) being in the away mode (22), independently controlling (S140) a setting of each of the plurality of devices (10) based on a usage pattern (12) of the respective device (10); wherein the independently controlling (S140) a setting of each of the plurality of devices (10) comprises: for a specific device (10), determining (S141) a first point in time (31) to change a setting of the device (10) based on the usage pattern (12) of the device (10), wherein the first point in time (31) is limited to: any of a set of predetermined points in time during a day, and a point in time where the smart home system (20) is set in the away mode (22); calculating (S142) a second point in time (32) by adding a random offset in time to the first point in time (31); changing (S143) the setting of the device (10) at (Continued)

the second point in time (32); determining (S144) a stasis period (33) during which the setting of the device (10) should be maintained based on the usage pattern (12) of the device (10); and maintaining (S145) the setting of the device (10) for the stasis period (33). A smart home system (20) is also provided.

15 Claims, 6 Drawing Sheets

(51) Int. Cl.
*G05B 15/02* (2006.01)
*G08B 15/00* (2006.01)

(52) U.S. Cl.
CPC ...... *H04L 12/2803* (2013.01); *H04L 12/2825* (2013.01); *G05B 2219/163* (2013.01); *G05B 2219/2642* (2013.01); *H04L 2012/285* (2013.01)

(58) Field of Classification Search
CPC .............. G05B 15/02; G05B 2219/163; G05B 2219/2642; G05B 2219/25168
See application file for complete search history.

(56) References Cited

U.S. PATENT DOCUMENTS

| | | |
|---|---|---|
| 2015/0160636 A1 | 6/2015 | McCarthy, III et al. |
| 2015/0287310 A1* | 10/2015 | Deliuliis .............. H05K 999/99 340/628 |
| 2017/0191695 A1* | 7/2017 | Bruhn ................ H04N 21/4131 |
| 2019/0025782 A1* | 1/2019 | Mathews ............... G05B 15/02 |
| 2019/0088099 A1 | 3/2019 | Garg et al. |
| 2022/0168540 A1* | 6/2022 | Eng ......................... G06F 3/147 |
| 2022/0376976 A1* | 11/2022 | Ramasamy ......... H04L 41/0672 |

OTHER PUBLICATIONS

Extended European Search Report for EP Application No. 21162963.9 dated Sep. 6, 2021 (11 pages).

\* cited by examiner

SMART HOME SYSTEM AND CONTROLLING OF THE SAME

CROSS-REFERENCE TO RELATED APPLICATIONS

This application claims priority to European Patent Application No. 21150969.0 filed on Jan. 11, 2021, and to European Patent Application No. 21162963.9, filed Mar. 16, 2021, the disclosures of which are hereby incorporated by reference in their entireties. To the extent appropriate, a claim of priority is made to each of the above-disclosed applications.

TECHNICAL FIELD OF THE INVENTION

The present disclosure relates to the field of smart homes, and in particular, it relates to a method for controlling a plurality of devices of a smart home system. The disclosure also relates to a smart home system comprising circuitry configured to carry out the method.

BACKGROUND

In homes, it is often desirable to prevent burglary attempts. While there presently exists alarm systems for preventing burglary attempts in progress, it may be even more desirable to prevent a possible burglary before it occurs. Burglars may monitor homes over time to detect when the occupant(s) leave the home, e.g. for work or for vacation. This may be detected by noticing e.g. that the lights are off when they would normally be on.

Presently there exists timers for plugs for automatically controlling the on- or off-state of specific devices according to a predetermined schedule. However, a potential burglar may easily recognize such a static schedule. Further, each such timer may only control a single outlet.

It would therefore be desirable for a system to be able to control multiple devices in a more advanced manner than a static schedule. Thus, there is room for improvements in the field of automatically controlling devices of a home.

SUMMARY

In view of the above, it is thus an object of the present invention to overcome or mitigate at least some of the problems discussed above. In particular, it is an object of the present disclosure to provide a method for controlling a plurality of devices of a smart home system. Further and/or alternative objects of the present invention will be clear for a reader of this disclosure.

According to a first aspect of the invention, there is provided a computer implemented method for controlling a plurality of devices of a smart home system. The method comprises: switching the smart home system between a home mode and an away mode; and upon the smart home system being in the away mode, independently controlling a setting of each of the plurality of devices based on a usage pattern of the respective device; wherein the independently controlling a setting of each of the plurality of devices comprises: for a specific device, determining a first point in time to change a setting of the device based on the usage pattern of the device, wherein the first point in time is limited to: any of a set of predetermined points in time during a day, and a point in time where the smart home system is set in the away mode; calculating a second point in time by adding a random offset in time to the first point in time; changing the setting of the device at the second point in time; determining a stasis period during which the setting of the device should be maintained based on the usage pattern of the device; and maintaining the setting of the device for the stasis period.

By the term "smart home system" should, in the context of present specification, be understood as a system of connected devices in a home and a server or gateway connected to the plurality of devices and being configured to control the plurality of devices.

By the term "device" should, in the context of present specification, be understood as any home device with controllable settings, such as a light source, speaker, television and/or blind.

By the term "setting" should, in the context of present specification, be understood as a control option of a device, such as an on/off state, volume, channel or dimmer amount. Preferably, a change in a setting of any one of the devices is noticeable from outside the home, e.g. by a potential burglar.

By the term "usage pattern" should, in the context of present specification, be understood as when, for how long and how often a setting of a device is changed and to what it is changed. The usage pattern is time-dependent and may be unique to each device or related to a specific device type or sub-type. The usage pattern may be pre-generated and/or generated as the devices are used.

Independently controlling a setting of each of the plurality of devices based on a usage pattern may comprise determining a frequency or time of day to change a setting based on the usage pattern.

The set of predetermined points in time may e.g. be every 30 minutes or 1 hour. By limiting the potential points in time when a setting may be changed, a frequency of changes is limited to a more realistic frequency and statistics gathering and calculation based on the usage pattern is simplified as a limited number of discrete points in time are used. The set of predetermined points in time have a set interval between each point in time.

The home mode of the smart home system is to be used when occupants of the home are present, and the away mode of the smart home system is to be used when occupants of the home are away. The smart home system may be configured to automatically switch the mode of the smart home system by e.g. detecting a door being locked and unlocked.

Controlling a setting of each of the plurality of devices may comprise controlling a specific device to not change any setting, while controlling another specific device to change several settings at once and later changing one of the previously changed settings to another setting.

By calculating a second point in time by adding a random offset in time to the first point in time, the actual point in time when a setting of a specific device is changed and will be variable and non-static. It will therefore be difficult for a potential burglar to notice the change being automatically controlled. However, using the usage pattern to determine the first point in time will still result in that changing the setting of the device is done at a realistic (for that user) point in time during the day.

The random offset in time may be positive or negative, the second point in time may therefore be before or after the first point in time.

The stasis period is independent of the predetermined points in time and may e.g. be 45 minutes or 1-2 hours. By maintaining the setting of the device for the stasis period, the frequency of change of a specific device may be more realistic. The stasis period may be dependent on the usage pattern of the specific device being controlled. By the stasis period being dependent on the usage pattern, a more credible frequency of change of a specific device may be more realistic. Alternatively, the stasis period may be predetermined and/or general for each device.

The random offset may be based on the set of predetermined points in time. For example, the random offset may be within a set fraction of the frequency of the predetermined points in time. If the predetermined points in time are 30 minutes apart, the random offset may then e.g. be −10-10 minutes or 1-30 minutes.

The usage pattern may be dependent on one of more of: time of day, day of week, month of year. By monitoring these dependencies, the independent control of the settings of each of the devices may use this further data to make more realistic automatic control.

The step of determining the stasis period may comprise determining a period of time for maintaining the setting of the specific device from the usage pattern and multiplying the period of time with a random factor to determine the stasis period. This may e.g. comprise determining an average time the specific device has historically been turned on at that specific point in time and based on that, determining a period of time for maintaining the setting of the specific device. Then, that period of time is randomly changed by multiplying it with a random factor. The random factor makes the independent control of the settings of the device less predictable but still realistic.

The method may further comprise, after the smart home system is switched from a home mode to an away mode, calculating a schedule for independently controlling a setting of each of the plurality of devices, the schedule being valid for a predetermined period of time. By calculating a schedule for a predetermined period of time, calculations may be limited in frequency which may preserve processing power and the calculations may further be ensured to be finished by the time changes are to be made. Moreover, the schedule may be presented to the user via e.g. an app on the user's phone, to give the user a feeling of safety that the away mode functions as it should. The predetermined period of time may e.g. be 24 hours. At the end of the predetermined period of time, the schedule may be re-calculated.

The step of independently controlling a setting of each of the plurality of devices based on a usage pattern of the respective device may comprise deriving: an average time each specific device is on; and a probability of an on-setting of each specific device being adjusted. These data points may be useful for imitating a behavior of the occupants of the home.

The step of independently controlling a setting of each of the plurality of devices based on a usage pattern of the respective device may comprise deriving: an average time each specific device is on during a day and during a sample period; and a probability of an on-setting of each specific device being adjusted during the day and during the sample period. The sample period may e.g. be between the predetermined points in time. By comparing these data points at different intervals and controlling the setting of each of the plurality of devices according to these different intervals, a more realistic imitation may be achieved by the method. For example, if the usage pattern indicates that a device is turned on 4 times a day on average, and twice during the sample period, the control of the on/off setting of that device may adapt to turn it on relatively infrequently during the day and once it is turned on, it is changed frequently.

The method may further comprise: upon the smart home system being in the home mode, independently monitoring the setting of each of the plurality of devices of the smart home system; and deriving the usage pattern of each respective device from the independently monitored setting of each corresponding device. By deriving the usage pattern of each respective device from the independently monitored setting of each corresponding device during the home mode, the usage pattern will update as the method is used to be more accurate to the specific behavior of the occupants of the home. This will make the independent control of each of the plurality of devices more realistic. The data collected to derive the usage pattern may be used to update existing data, replace predetermined placeholder data or add new data.

The method may further comprise, upon the smart home system entering the away mode, maintaining the setting of at least some of the plurality of devices for a start period, the start period being calculated, for a device of the plurality of devices, from the usage pattern of the device and information pertaining to how long a current settings of the device has been applied at the time of entering the away mode. The start period is independent of the predetermined points in time and may e.g. be 45 minutes or 1-2 hours. By maintaining the setting(s) of at least some of the plurality of devices for a start period, it may not be immediately apparent that an occupant of the home has left, since settings of devices are maintained. By the start period being calculated from the usage pattern of the device, a more realistic start period may be achieved.

For example, if the usage pattern of the device indicates that a television is set to a specific channel for an average of 3 hours at a time and it has been set to that channel for 2 hours, the start period is set to 1 hour.

As another example, if the usage pattern of a light bulb indicates that it has historically been on for an average of 5 hours when being turned on and it has been on for 2 hours when a change from home mode to away mode is made, the start period is set to 3 hours.

The method may further comprise, upon the smart home system entering the away mode, maintaining an on-setting of at least some of the plurality of devices for the start period. By at least maintaining an on-setting of at least some of the plurality of devices for the start period, it may be even less apparent that an occupant of the home has left.

According to a second aspect there is provided a smart home system comprising: a plurality of devices; a database comprising a usage pattern of each respective device of the plurality of devices; and a server being operably connected to the plurality of devices and the database, the server comprising control circuitry configured to execute: a mode function configured to switch a setting of the server between a home mode and an away mode; and a control function configured to, upon the server being in the away mode, independently control a setting of each of the plurality of devices based on the usage pattern of the respective device; wherein the independent control of a setting of each of the plurality of devices comprises: for a specific device, determining a first point in time to change a setting of the device based on the usage pattern the device, wherein the first point in time is limited to: any of a set of predetermined points in time during a day, and a point in time where the smart home system is set in the away mode; calculating a second point in time by adding a random offset in time to the first point in time; changing the setting of the device at the second point in time; determining a stasis period during which the setting of the device should be maintained based on the usage pattern of the device; and maintaining the setting of the device for the stasis period.

The database may comprise local memory and/or cloud-based storage. The server may be a local gateway unit and/or be cloud-based.

The server being operably connected to the plurality of devices and the database may comprise wired or wireless communication, e.g. Wi-Fi, Bluetooth®, ZigBee or Thread.

The control circuitry may comprise computing means such as a processor.

Each of the plurality of devices may be of any type of the following group: light source, speaker, television, and/or blind.

The settings of the devices controlled by the smart home system are preferably noticeable from outside of the home in order to convince a potential burglar. For example, controlling settings of a light source may comprise changing an on/off state, a light intensity or the color of the light. Controlling settings of a speaker may comprise changing a volume, mixing or the type of sound produced. Controlling settings of a television may comprise changing a volume or channel. Controlling settings of a blind may comprise changing an extension level of the blind.

One or more of the plurality of devices may be excluded from the independent control of a setting by the control circuit based on a recent change in usage pattern of said one or more of the plurality of devices. By excluding one or more of the plurality of devices, outliers may be removed to provide more realistic automatic control. Additionally, a recent change in usage pattern may indicate that a device is faulty or broken, which means that there may be a risk in changing its settings. Such risk may therefore be mitigated by excluding any device that has had a recent change in usage pattern.

As an alternative, the smart home system may promote the most recent parts (e.g. within the last two weeks) of the usage pattern higher than older parts when basing the independent control of a setting of each of the plurality of devices on the usage pattern. Thereby, the control is more adaptive to changes in the usage pattern.

As another alternative, the usage pattern may comprise thresholds to remove or limit outliers to provide more realistic automatic control.

The control circuitry may further be configured to execute a monitor function configured to: upon the server being in the home mode, independently monitor the setting of each of the plurality of devices; and store data relating to the usage pattern of the respective device in the database based on the independently monitored setting of the corresponding device. The data collected may be used to derive the usage pattern, which may comprise updating existing data, replacing predetermined placeholder data or adding new data. By deriving the usage pattern of each respective device from the independently monitored setting of each corresponding device during the home mode, the usage pattern will change as the smart home system is used to be more accurate to the specific behavior of the occupants of the home. This will make the independent control of each of the plurality of devices more realistic.

One or more subsections of the plurality of devices may be created according to usage pattern or a location of the devices, wherein the setting of each of the devices of each subsection are codependently controlled by the control circuit. Such subsections may be used to control an entire room at once or all devices used when waking up in the morning, which may result in a simpler and more realistic automatic control.

Alternatively, one or more subsections of the plurality of devices may be created according to user preference and/or device type.

The usage pattern of the respective device stored in the database may be predetermined during manufacturing based on the type of the device and updated based on the independent monitoring of the setting of each of the plurality of devices. This ensures that the smart home system will be able to automatically control the plurality of devices in a realistic manner even without collecting data relating to the usage pattern of at least one of the plurality of devices is collected in the home mode.

Alternatively, or in combination, the usage pattern of the respective device stored in the database may be randomly determined during manufacturing based on the type of the device and updated based on the independent monitoring of the setting of each of the plurality of devices.

Alternatively, or in combination, the away mode of the smart home system may be unavailable until a predetermined amount of data relating to the usage pattern of at least one of the plurality of devices is collected in the home mode.

The smart home system further may further comprise a remote unit in communication with the server, the remote unit being configured to switch the setting of the server between the home mode and the away mode. This may enable automatic and reliable switching between the home mode and the away mode. The remote unit may e.g. be a cell phone of a user or a smart lock of the smart home.

According to a third aspect there is provided a computer program product comprising a computer-readable storage medium with instructions adapted to carry out the method of the first aspect when executed by a device having processing capabilities.

The second and third aspects may generally have the same features and advantages as the first aspect.

Generally, all terms used in this disclosure are to be interpreted according to their ordinary meaning in the technical field, unless explicitly defined otherwise herein. All references to the word "comprising" does not exclude other elements or steps, and the indefinite articles "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
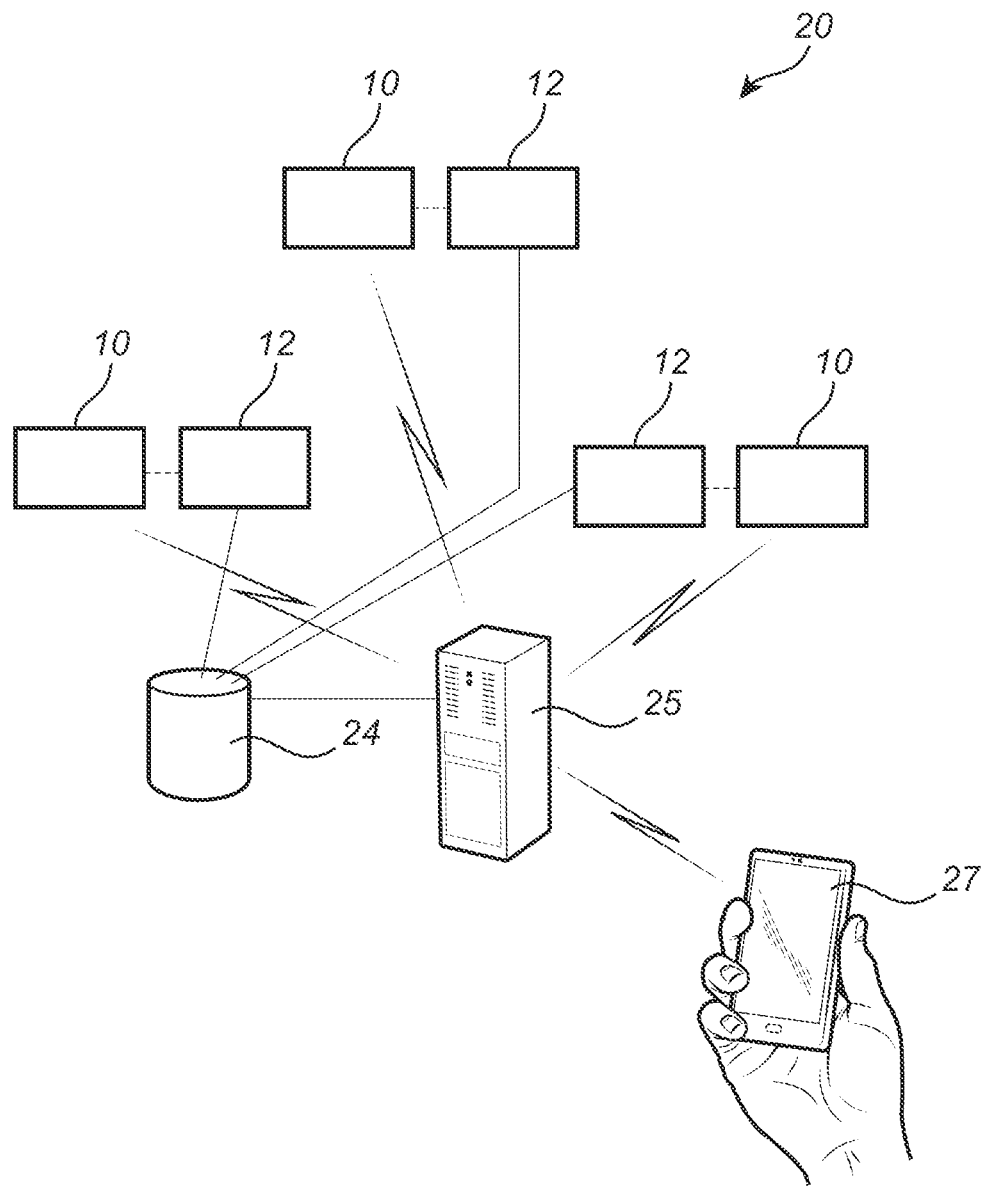
FIG. 1 is a schematic view of a smart home system.

FIG. 1 shows a smart home system 20. The smart home system 20 comprises a plurality of devices 10 in a home. The plurality of devices 10 may comprise light sources, speakers, televisions and/or blinds.

The smart home system 20 further comprises a database 24 comprising a usage pattern 12 of each respective device 10 of the plurality of devices 10. Each usage pattern 12 comprises data that describe a real or estimated history of use of a specific device 10 of the plurality of devices 10.

The smart home system 20 further comprises a server 25 being operably connected to the plurality of devices 10 and the database 24. The connections of the server 25 are shown as dashes of lightning in FIG. 1 and may be physical wires or wireless communication gateways.

The database 24 and server 25 may be implemented using local computing unit(s) and/or could-based structures.

The server 25 comprises control circuitry configured to execute functions, for example a mode function configured to switch a setting of the server 25 between a home mode 21 and an away mode 22.

The home mode 21 of the server 25 is intended to be active when occupants of the home are at home. The away mode 22 of the server 25 is intended to be active when occupants of the home are away.

The mode function may be executed automatically, e.g. by detecting that an electronic lock or alarm has been activated or deactivated. Additionally, automatic activation or deactivation of the mode function by using sensors such as cameras or motion detectors to detect whenever the occupants leave or approach the home. Furthermore, the smart home system 20 may have an automatically or manually generated schedule of when occupants of the home are present, which may be used for automatic control of the mode function. Manual execution of the mode function is of course also possible.

The control circuitry is further configured to execute a control function configured to, upon the server 25 being in the away mode 22, independently control a setting of each of the plurality of devices 10 based on the usage pattern 12 of the respective device 10.

A portion of the plurality of devices 10 operably connected to the server 25 may be automatically or manually configurable to be or not be controllable in the away mode 22. Thereby, energy inefficient or sensitive devices 10 may be configured to not be controllable in the away mode 22.

Accordingly, the control function controls the settings of the plurality of devices 10 when the occupants are away. By basing the independent control on the usage pattern 12 of each respective device 10, the independent control uses the history of the device 10 to be more realistic.

The usage pattern 12 may comprise data that is dependent on the time of the day when it is being collected, the day of the week when it is being collected and/or the month of the year when it is being collected.

Accordingly, the data of the usage pattern 12 may be sorted into e.g. different times of day such that data collected during the morning is separated from data collected during the evening and night. Thereby, when basing the independent control of a setting of a device 10 on the usage pattern 12 of that device 10, the control pattern may be different in the morning compared to the evening if the usage pattern 12 is different in the morning compared to the evening. This may result in more realistic control, as e.g. more lights are usually on during the evening compared to the morning.

The data of the usage pattern 12 may be even more specific regarding the time when it was collected. For example, if the bedroom lamp is regularly on between 22:00-23:00 on non-summer weekdays, this data may be used for a more realistic automatic control by mimicking this behavior.

Settings of the plurality of devices 10 may e.g. comprise an on/off state, a light intensity or a volume. The settings may therefore be detectable by a potential burglar monitoring the home.

The control circuitry may be configured to derive an average time each specific device 10 is on based on the usage pattern 12 of that device 10.

The control circuitry may further be configured to derive a probability of an on-setting each specific device 10 is adjusted based on the usage pattern 12 of that device 10.

Thereby, more data of the usage pattern 12 may be created from the data acquired that may be more easily processed by the control circuitry.

The independent control of a setting of each of the plurality of devices 10 comprises, for a specific device 10, determining a first point in time to change a setting of the device 10 based on the usage pattern 12 the device 10.

Figure 4:
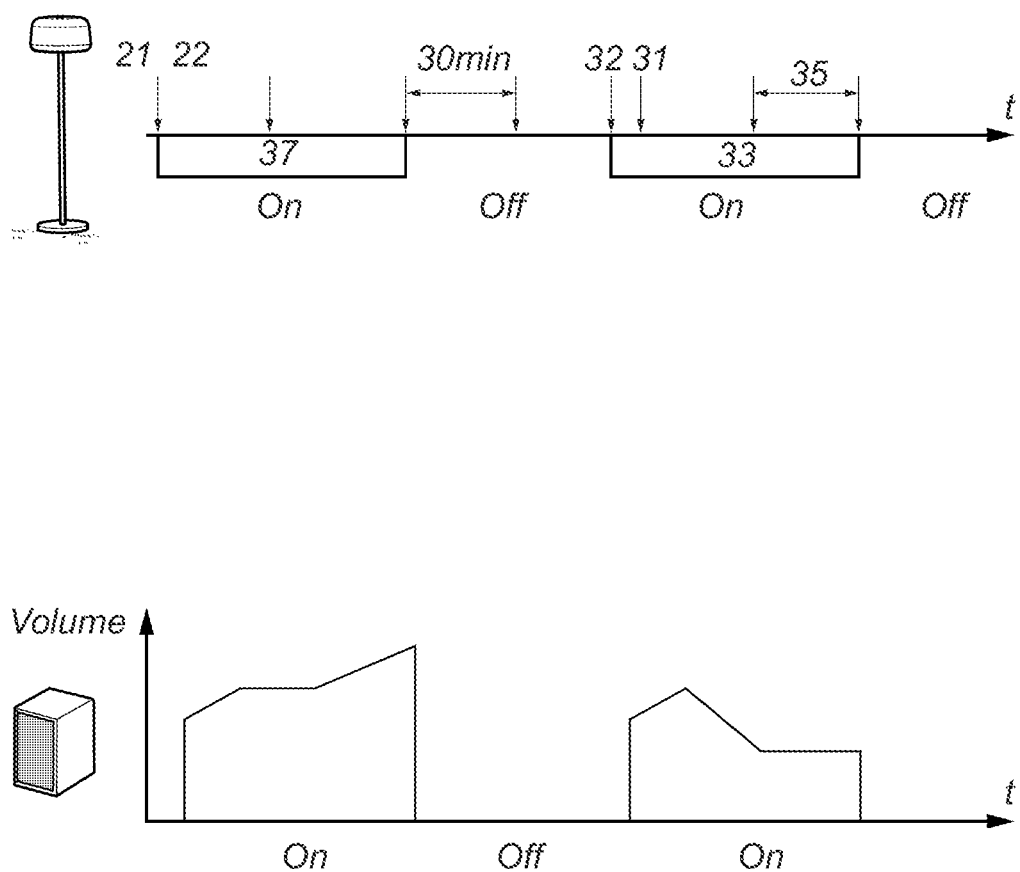
FIG. 4 is a schematic view of timelines describing automatic control of settings.

In the following, reference will be made to both FIG. 1 and FIG. 4. The first point in time 31 is limited to: any of a set of predetermined points in time during a day, and a point in time where the smart home system 20 is set in the away mode 22. Thereby, changes in the setting of the device 10 do not happen too frequently.

The set of predetermined points in time during a day may e.g. be every 30 minutes or every hour.

The independent control of a setting of each of the plurality of devices 10 further comprises calculating a second point in time 32 by adding a random offset in time to the first point in time 31 and changing the setting of the device 10 at the second point in time 32.

By adding a random offset in time to the first point in time 31, the independent control of the settings of the device 10 is less predictable, but still realistic. The random offset may be positive or negative.

The independent control of a setting of each of the plurality of devices 10 further comprises determining a stasis period 33 during which the setting of the device 10 should be maintained based on the usage pattern 12 of the device 10; and maintaining the setting of the device 10 for the stasis period 33.

The stasis period 33 further ensures that changes in the setting of the device 10 are more realistic, e.g. because they do not happen too frequently. The stasis period 33 may be determined by first determining a period of time for maintaining the setting of the specific device 10 based on the usage pattern 12. The determined period of time for maintaining the setting may correspond to an average time that the device 10 has historically maintained the setting according to the usage pattern 12. The average time that the device 10 has historically maintained the setting according to the usage pattern 12 may further be limited to data collected during a similar time of day and/or day of week as when the stasis period starts.

Then, the determined period of time for maintaining the setting is multiplied with a random factor to determine the stasis period 33. The random factor is a value between 0 and 2 such as 0.5-1.5 and may e.g. be 0.8-1.2. These values allow for a less predictable but still realistic control.

When the server 25 is in the home mode 21, the smart home system 20 may be configured to collect data for the usage pattern 12. The control circuitry of the server 25 may be configured to execute a monitor function. If the server 25 is in the home mode 21, this function comprises independently monitoring the setting of each of the plurality of devices 10.

The monitor function may further comprise storing data relating to the usage pattern 12 of each respective device 10 in the database 24 of the smart home system 10 based on the independently monitored setting of the corresponding device 10.

The data relating to the usage pattern 12 to a device 10 may comprise the settings currently applied to the device 10, information pertaining to how long a current setting of the device 10 has been applied, when the settings change and to what they are changed.

Storing data relating to the usage pattern 12 of a device 10 may comprise adding data to the database 24. This may in turn comprise creating metadata such as labels to identify e.g. the date the data is collected. Alternatively or additionally, storing data may comprise creating new structures of the database 24 to e.g. separate data collected during different days.

The usage pattern 12 may be pre-loaded with data during manufacturing based on the type of device 10 the usage pattern 12 relates to. Storing data relating to the usage pattern 12 of a device 10 may further comprise updating or replacing such pre-loaded data.

In an embodiment where the usage pattern 12 is not pre-loaded with data during manufacturing, the away mode 21 of the smart home system 20 may be unavailable until a predetermined amount of data relating to the usage pattern 12 of at least one of the plurality of devices 10 is collected when the smart home system 20 is in the home mode 22.

In one embodiment, the data relating to the usage pattern 12 identifies when devices 10 have historically been on. For example, the data may be divided up into separate data sets, one data set identifying the likelihood that a device 10 is on during a specific time period, such as one likelihood for each hour during the day, or each 30-minute period during the day. Another data set may then specify the same time periods and identify for how long on average the device 10 is on, if it is turned on during that time period of the day. The combination of data sets for all controllable devices 10 in the home may define how many devices 10, on average, are turned on during different time periods of the day. These data points may in this embodiment be used for determining, in the away mode 22, which devices 10 that should be turned on or off, and for how long a device 10 should be turned on or off. Moreover, the number of times a device 10 historically is turned on during a day may also be used for determining an on/off schedule in the away mode 22.

The smart home system 20 may further comprise a remote unit 27 in communication with the server 25. The remote unit 27 is configured to switch the setting of the server 25 between the home mode 21 and the away mode 22. Hence, the remote unit 27 may execute the mode function configured to switch a setting of the server 25.

The remote unit 27 may e.g. be a cell phone of a user or a smart lock of the home. The remote unit 27 may automatically execute the mode function e.g. when the smart lock is locked or unlocked, or when the cell phone approaches or leaves the home. Additionally, the remote unit 27 may manually execute the mode function.

Figure 2:
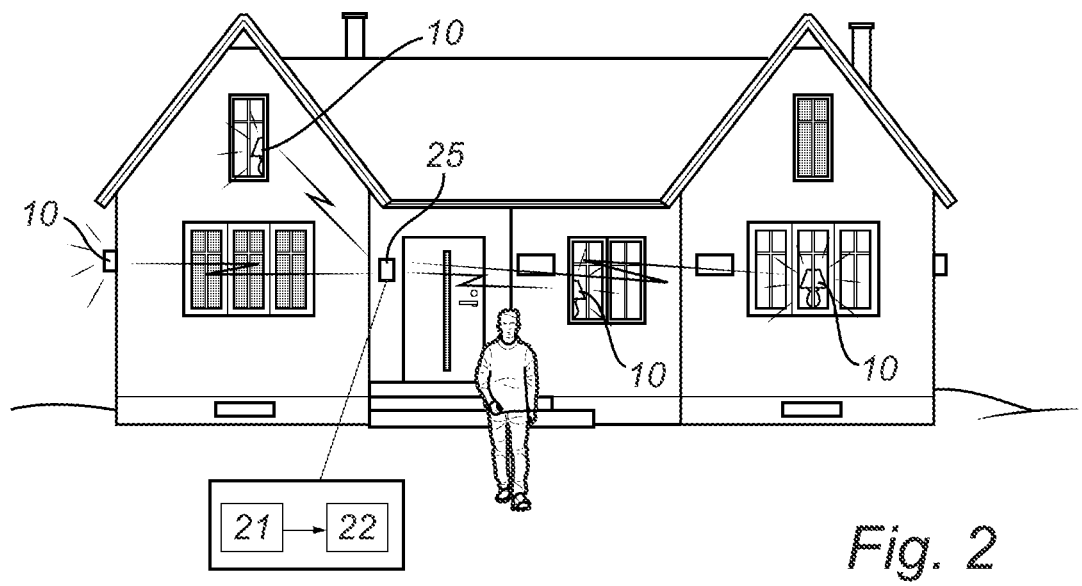
FIG. 2 is an illustrative view of a smart home system in use.

FIG. 2 is an illustrative view of a smart home system in use. The smart home system comprises a plurality of light sources 10. As the occupant of the home leaves, the server 25 is set from the home mode 21 to the away mode 22, either manually or automatically.

After the server 25 enters the away mode 22, the control circuit of the server 25 executes the control function to independently control a setting of each of the plurality of light sources 10 based on the usage pattern of the respective light source 10.

Accordingly, one of the light sources 10 is automatically turned on after the occupant leaves and another light source 10 is kept on and later dimmed to have a lower intensity of light. A potential burglar monitoring the home may therefore not detect whether anyone is left in the home after the occupant has left based on the realistic light control.

Figure 3:
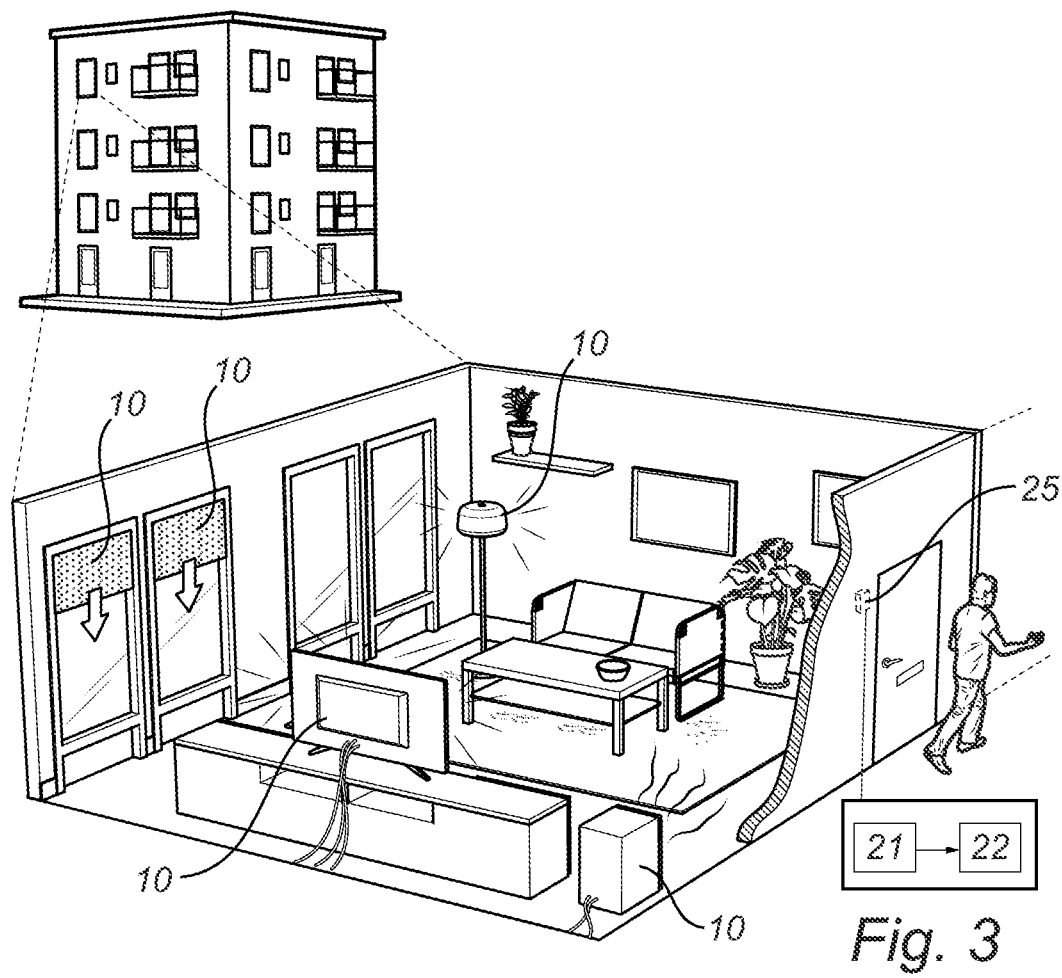
FIG. 3 is an illustrative view of a smart home system in use.

FIG. 3 is an illustrative view of a smart home system in use. The smart home system comprises a plurality of devices 10. As the occupant of the home leaves, the server 25 is set from the home mode 21 to the away mode 22, either manually or automatically.

After the server 25 enters the away mode 22, the control circuit of the server 25 executes the control function to independently control a setting of each of the plurality of devices 10 based on the usage pattern of the respective device 10.

Accordingly, blinds 10 are automatically adjusted, a light 10 is turned on, a channel of a television is changed and a volume of a speaker 10 is increased after the occupant leaves. A potential burglar monitoring the home may therefore not detect whether anyone is left in the home after the occupant has left based on the realistic device control.

One of the devices 10 may be excluded from the independent control of a setting by the control circuit. This exclusion is based on a recent change in its usage pattern. For example, if a setting of the device 10 was historically changed on average four times a day but the last two days that setting has not been changed at all, this may warrant exclusion. The timing and threshold for excluding a device 10 or a specific setting of a device 10 may depend on the embodiment and device type.

By excluding specific devices 10 or settings, broken devices 10 may be excluded that otherwise might waste electricity or cause accidents, and/or that may make the change of settings in away mode less realistic due to faulty data used to determine the usage pattern.

The plurality of devices 10 may comprise all remotely controllable devices 10 in a home, or all such remotely controllable devices 10 of a specific type, such as light sources and/or blinds, or be user defined. In some embodiments, the usage patterns of the devices 10 are used to identify which devices 10 that should be automatically controlled in the away mode 22. For example, the usage pattern may be compared to sunset and sunrise data to identify devices 10 where the usage pattern data correlate with when the sun is up. These devices 10 may then be identified as light sources (on when the sun is not up) and/or blinds (down when the sun is up) that probably would be noticeable from the outside of the home, and thus advantageously controlled in the away mode 22.

Such a correlation may also be used to control the identified devices 10 in a more realistic manner by checking sunset and sunrise data when the server 25 is in the away mode 22 and adapting the automatic control accordingly.

The plurality of devices 10 may be divided into subsections. The subsections may define a shared type of device 10, a similar location of the devices 10, a similar usage pattern of the devices 10 and/or any other user-defined grouping of devices 10.

In an embodiment with subsections, the control function further comprises codependently controlling a setting of each of the plurality of devices 10 of a subsection based on the usage pattern of one of the devices 10 of the subsection.

Returning to FIG. 4, it is a schematic view of timelines describing automatic control of settings of different devices. The timelines comprise predetermined points in time with a set interval between each point in time and the first timeline has the predetermined points in time explicitly marked as arrows.

The first timeline comprises a first and second point in time 31, 32. The first point in time 31 indicates when a setting of the device is to be changed based on the usage pattern of the device, e.g. based on an average time before it would historically be changed. The first point in time 31 is one of the predetermined points in time or the point in time where the smart home system is set to the away mode 22. For each device controllable in the away mode, the system will determine for each predetermined point in time and when the away mode 22 is activated, whether a setting of that device should be adjusted or not.

The second point in time 32 is calculated by adding a random offset in time to the first point in time 31. The random offset may be positive or negative, and is positive in the case of the first point in time 31 being the point in time where the smart home system is set to the away mode 22.

The random offset may be based on the frequency of the set of predetermined points in time, e.g. being at most a specific fraction of the period between two predetermined points in time. If the predetermined points in time are 30 minutes apart, the random offset may then e.g. be −10-10 minutes or 1-30 minutes.

The second point in time 32 is independent of the predetermined points in time. The second point in time 32 determines when the setting is actually changed by the control circuitry.

After a setting has been changed, the setting is prevented from being changed for at least a stasis period 33 running from the second point in time 32 to an end point in time. This end point in time may be independent from the predetermined points in time or e.g. the next or second next predetermined point in time compared to the second point in time 32.

The first timeline comprises a start period 37. The control circuitry is configured to maintain a setting of the device for the start period 37. The start period 37 is calculated for the device based on the usage pattern of the device and information pertaining to how long the current setting of the device has been applied at the time of entering the away mode 22.

For example, the device has been on for one hour at the time of entering the away mode 22 and the usage pattern indicates that the device should be on for two hours at a time. The start period 37 will then be one hour and may or may not be dependent on the predetermined points in time.

According to an embodiment, after the smart home system 20 is switched from a home mode 21 to an away mode 22, a schedule is calculated for independently controlling a setting of each of the plurality of devices. The schedule determines when and what setting to change for a predetermined period of time. The schedule may e.g. be valid for twenty-four hours, and then re-calculated for the next twenty-four hours once it has run out.

A second schedule directly consecutive of a first schedule may make use of the first schedule by e.g. randomly shifting different second points in time or re-randomizing the random offset applied to each first point in time. The second schedule may in other embodiments be calculated independently of the first schedule.

Control of several devices may cooperate to recreate dependent usage patterns, e.g. if one device is usually turned on shortly after another device this may be reflected in the independent control of each of the devices.

These types of patterns may be reflected in cooperative schedules of several devices to more accurately recreate dependent usage patterns.

The first timeline further comprises a sample period 35. The sample period 35 shown in FIG. 4 shows it corresponding to the interval between two adjacent predetermined points in time, however, other lengths of sample periods 35 are also possible.

The control circuitry may be configured to derive an average time each specific device is on during a day and during the sample period 35 based on the usage pattern of that device. Thereby, both short-term and long-term data may be used to achieve a more realistic control.

The control circuitry may further be configured to derive a probability of an on-setting each specific device is adjusted during a day and during the sample period 35 based on the usage pattern of that device. Thereby, both short-term and long-term data may be used to achieve a more realistic control.

The second timeline shows control of two settings at once. The Y-axis shows control of the setting volume and the on/off setting is implied by the fact that volume is only relevant when the device is on and further noted by the X-axis.

Figure 5:
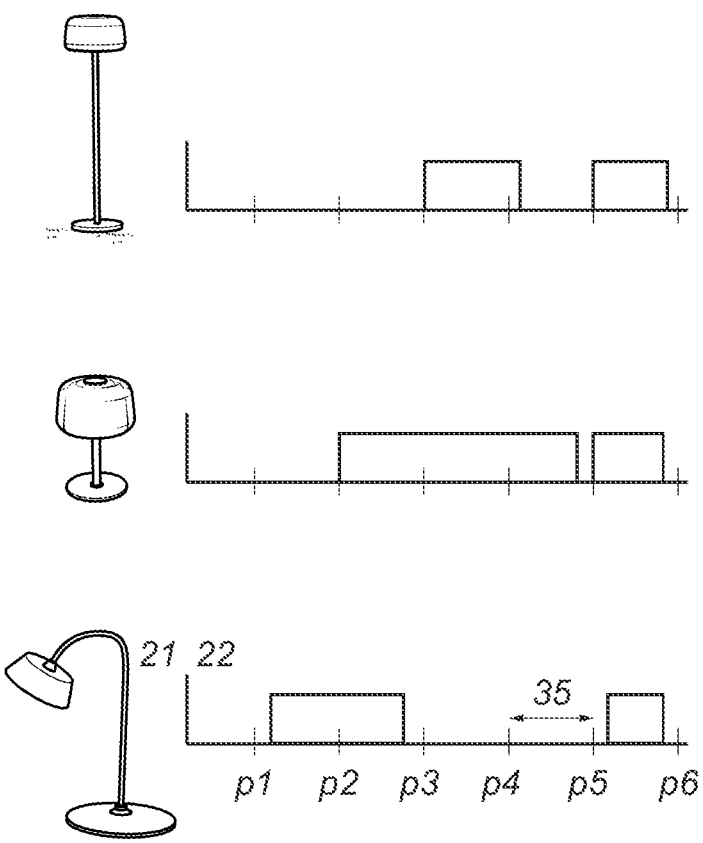
FIG. 5 is a schematic view of timelines describing automatic control of an on-setting of lights.

FIG. 5 shows three timelines describing automatic control of an on-setting of lights. The timelines comprise a number of predetermined points in time p1-p6 that are separated by a length of time corresponding to the sample period.

At the beginning of the timeline, the mode of the server is changed from home mode 21 to away mode 22. The usage pattern of each of the three lights when treated as a group indicate that on average, two of the three lights are on at the same time. At a first predetermined point in time p1, a third of the lights is turned on. This increases the probability of one of the other two lights to turn on as soon as possible, in order to match the usage pattern of the three lights. As soon as possible in this embodiment means at the next-coming predetermined point in time, however, this is only a higher probability and not a guarantee.

At a second predetermined point in time p2, a second of the lights is turned on. Sometime between the second predetermined point in time p2 and a third predetermined point in time p3, the third of the lights is turned off based on the usage pattern of the third of the lights. This increases the probability to turn on a first of the lights as the third of the lights is prevented from changing its on/off state because of its stasis period (in this example the third of the lights has a longer stasis period than the second of the lights). At a third predetermined point in time p3, the first of the lights is turned on.

As two lights are on when a fourth predetermined point in time p4 occurs, the third of the lights has a low probability to turn on at the fourth predetermined point in time p4. At different times between a fourth predetermined point in time p4 and a fifth predetermined point in time p4, the first and second of the lights are turned off. This increases the probability of each of the lights to turn on as soon as possible at the fifth predetermined point in time p5. At the fifth predetermined point in time p5, all of the lights turn on. As three lights are on when a sixth predetermined point in time p6 occurs, each of the lights has a high probability to turn off. At the sixth point in time p6, all of the lights are turned off.

It may further be seen that the third of the lights has randomly received a higher random offset than the other two lights. This gives a less predictable but still realistic control.

By basing the control of these three lights on probabilities derived from the usage pattern, a realistic and unpredictable control may be achieved as shown in FIG. 5.

In the following, a method 100 will be described for controlling a plurality of devices of a smart home system as previously described. The method 100 comprises a number of steps, some of which are optional and some of which may occur in any order.

Figure 6:
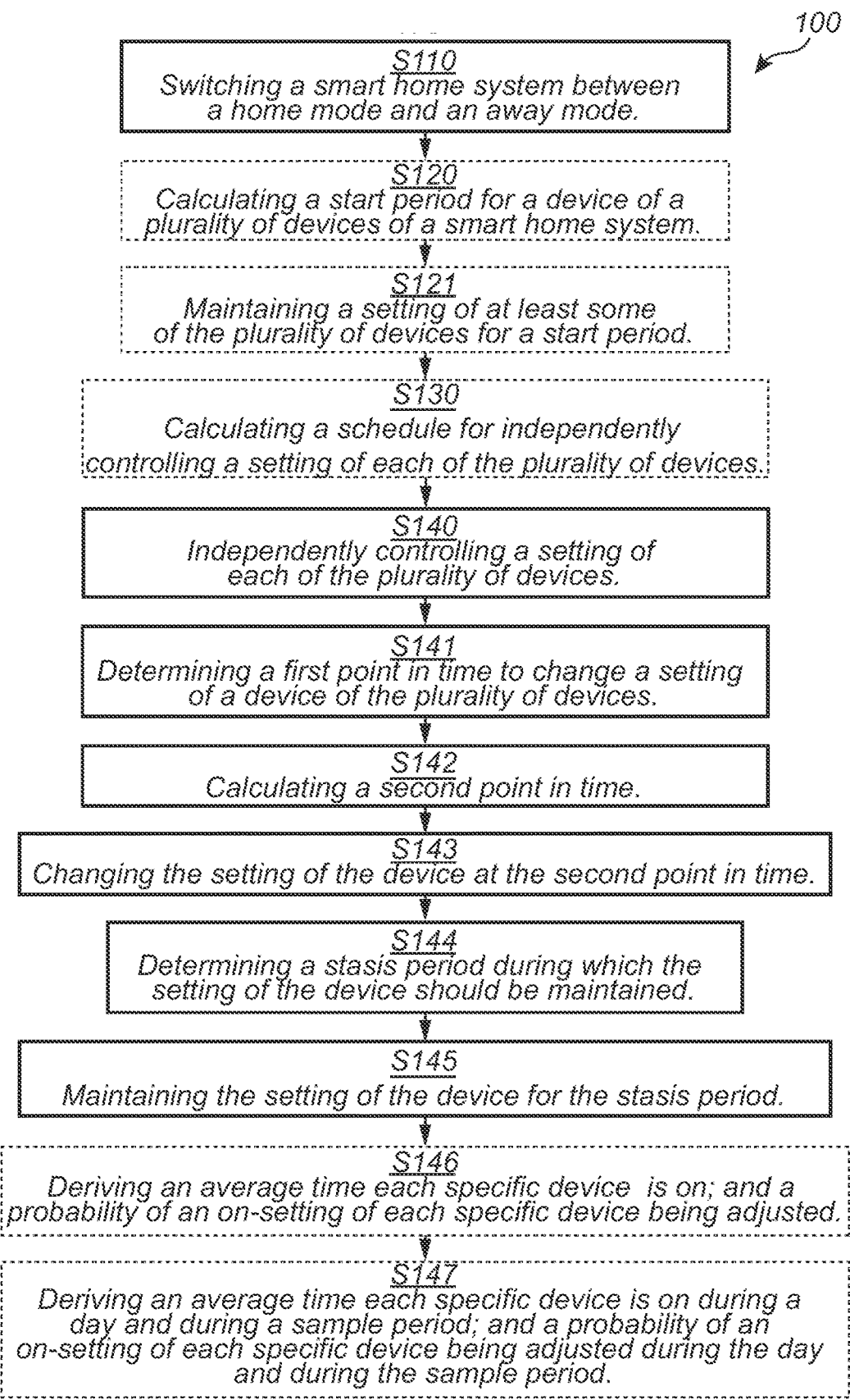
FIG. 6 is a flowchart of a method for controlling a plurality of devices of a smart home system.

FIG. 6 is a flowchart of a method 100 for controlling a plurality of devices of a smart home system. This method 100 may e.g. be run by a control circuit and database of a smart home system. Optional steps are shown with dashed boxes.

The first step is shown as switching S110 the smart home system between a home mode and an away mode. The different modes correspond to whether an occupant of the home is present or not. This switch may occur manually or automatically as previously described.

The next step is shown as calculating S120 a start period for a device of a plurality of devices of a smart home system. The start period may correspond to a suitable period for maintaining one or more settings of the device based on the usage pattern of the device and how long the current setting(s) of the device has been applied for.

Once the start period is calculated S120, the next step as shown is to maintain S121 one or more of the settings of said plurality of devices of the smart home system for the calculated start period.

The next step is shown as calculating S130 a schedule for independently controlling one or more settings of at least one of the plurality of devices. This schedule determines when the setting(s) of said at least one of the plurality of devices is to be changed for a predetermined period of time, e.g. 24 hours.

The next step is shown as independently controlling S140 a setting of each of the plurality of devices. The independent controlling S140 is based on a usage pattern of each respective device. This step S140 may be configured to only occur if the smart home system is in the away mode. This step S140 may comprise any number of sub-steps S141-S147.

The first sub-step is shown as determining S141 a first point in time to change a setting of a device of the plurality of devices. This determination S141 is based on the usage pattern of said device of the plurality of devices. The first point in time is limited to any of a set of predetermined points in time during a day, and a point in time when the smart home system is set in the away mode.

The next sub-step is shown as calculating S142 a second point in time. The second point in time is calculated S142 by adding a random offset to the first point in time.

The next sub-step is shown as changing S143 the setting of the device at the second point in time. This may comprise sending a control signal to the device at the second point in time. For example, a control signal may comprise an on-signal to turn on the device.

The next sub-step is shown as determining S144 a stasis period during which the setting of the device should be maintained. The stasis period may be dependent on the usage pattern of the device.

The next sub-step is shown as maintaining S145 the setting of the device for the stasis period. This may comprise not sending or blocking signals to the device until the period is up.

The next sub-step is shown as deriving S146 an average time each specific device is on; and a probability of an on-setting of each specific device being adjusted.

The next sub-step is shown as deriving S147 an average time each specific device is on during a day and during a sample period; and a probability of an on-setting of each specific device being adjusted during the day and during the sample period. The sample period may correspond to the interval between the predetermined points in time during a day.

Figure 7:
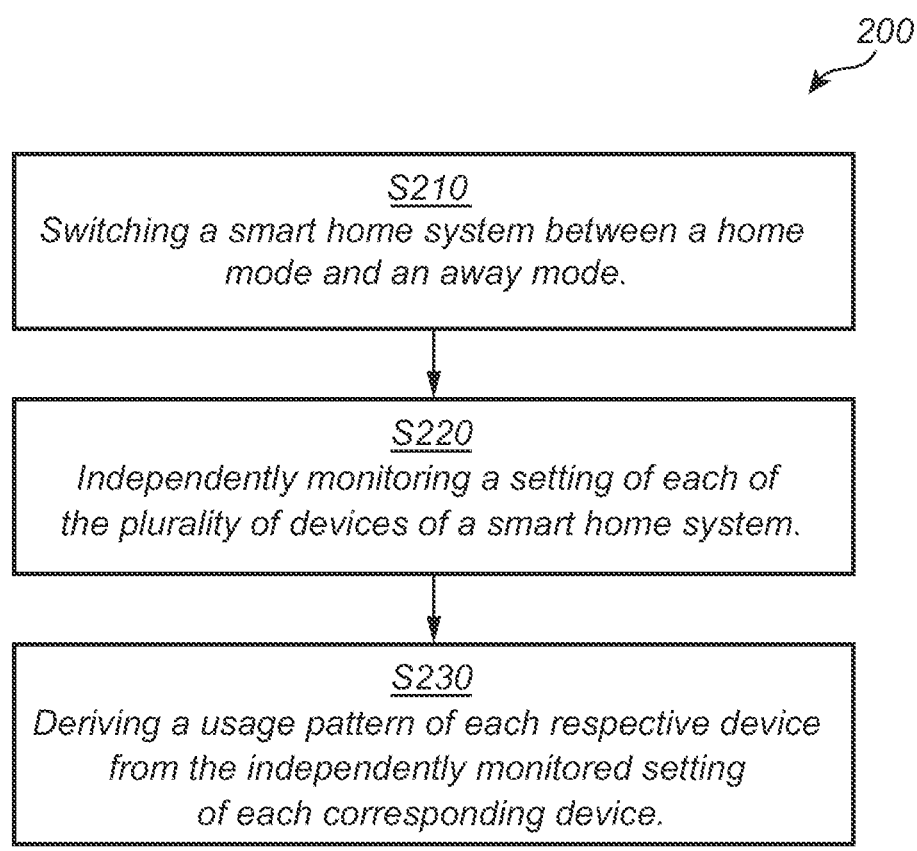
FIG. 7 is a flowchart of a method for monitoring a plurality of devices of a smart home system.

FIG. 7 is a flowchart of a method 200 for monitoring a plurality of devices of a smart home system. This method 200 may e.g. be run on a monitoring unit or any control circuit of a smart home system.

This method 200 is shown as an independent method, but may also be integrated with the method 100 for controlling a plurality of devices of a smart home system as disclosed in relation to FIG. 6.

For example, both methods 100, 200 may run on the same smart home system, wherein the method 100 for controlling the plurality of devices is run when the smart home system is in the away mode and the method 200 for monitoring the plurality of devices is run when the smart home system is in the home mode.

The first step is shown as switching S210 the smart home system between a home mode and an away mode. The different modes correspond to whether an occupant of the home is present or not. This switch may occur manually or automatically as previously described.

The next step is shown as independently monitoring S220 a setting of each of the plurality of devices of a smart home system. This step S220 may be configured to only occur if the smart home system is in the home mode.

The next step is shown as deriving S230 a usage pattern of each respective device from the independently monitored setting of each corresponding device. This step S230 may comprise creating new data, updating existing data or replacing placeholder data.

The methods may be implemented using a computer program product comprising a computer-readable storage medium with instructions adapted to carry out the methods when executed by a device having processing capabilities.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks, DVD, or other optical disk storage, magnetic cassettes, magnetic tape, magnetic disk storage or other magnetic storage devices, or any other medium which can be used to store the desired information, and which can be accessed by a computer. Further, it is well known to the skilled person that communication media typically embodies computer readable instructions, data structures, program modules or other data in a modulated data signal such as a carrier wave or other transport mechanism and includes any information delivery media.

What is claimed is:

1. A method for controlling a plurality of devices of a smart home system, the method comprising:
   switching the smart home system between a home mode and an away mode; and
   upon the smart home system being in the away mode, independently controlling a setting of each of the plurality of devices based on a usage pattern of the respective device;
   wherein the independently controlling a setting of each of the plurality of devices comprises:
      for a specific device, determining a first point in time to change a setting of the device based on the usage pattern of the device, wherein the first point in time is limited to: any of a set of predetermined points in time having a frequency with a same fixed interval between each point in time, and a point in time when the smart home system is set in the away mode;
      calculating a second point in time by adding a random offset in time to the first point in time, wherein the random offset is based on the frequency of the predetermined points in time;
      changing the setting of the device at the second point in time;
      determining a stasis period during which change of the setting of the device is prevented, the stasis period being based on the usage pattern of the device; and
      maintaining the setting of the device for the stasis period.

2. The method according to claim 1, wherein the random offset is within a set fraction of the frequency of the predetermined points in time.

3. The method according to claim 1, wherein the usage pattern is dependent on one of more of: time of day, day of week and month of year.

4. The method according to claim 1, wherein the step of determining the stasis period comprises determining a period of time for maintaining the setting of the specific device from the usage pattern and multiplying the period of time with a random factor to determine the stasis period.

5. The method according to claim 1, further comprising, after the smart home system is switched from a home mode to an away mode, the method further comprises calculating a schedule for independently controlling a setting of each of the plurality of devices, the schedule being valid for a predetermined period of time.

6. The method according to claim 1, wherein the step of independently controlling a setting of each of the plurality of devices based on a usage pattern of the respective device comprises deriving:
   an average time each specific device is on; and
   a probability of an on-setting of each specific device being adjusted.

7. The method according to claim 6, wherein the step of independently controlling a setting of each of the plurality of devices based on a usage pattern of the respective device comprises deriving:
   an average time each specific device is on during a day and during a sample period; and
   a probability of an on-setting of each specific device being adjusted during the day and during the sample period.

8. The method according to claim 1, upon the smart home system being in the home mode, the method further comprises:
   independently monitoring the setting of each of the plurality of devices of the smart home system; and
   deriving the usage pattern of each respective device from the independently monitored setting of each corresponding device.

9. The method according to claim 1, wherein upon the smart home system entering the away mode, the method further comprises maintaining the setting(s) of at least some of the plurality of devices for a start period, the start period being calculated, for a device of the plurality of devices, from the usage pattern of the device and information pertaining to how long a current settings of the device has been applied at the time of entering the away mode.

10. The method according to claim 9, wherein upon the smart home system entering the away mode, the method further comprises maintaining an on-setting of at least some of the plurality of devices for the start period.

11. A smart home system comprising:
    a plurality of devices;
    a database comprising a usage pattern of each respective device of the plurality of devices; and
    a server being operably connected to the plurality of devices and the database, the server comprising control circuitry configured to execute:
       a mode function configured to switch a setting of the server between a home mode and an away mode; and
       a control function configured to, upon the server being in the away mode, independently control a setting of each of the plurality of devices based on the usage pattern of the respective device;
    wherein the independent control of a setting of each of the plurality of devices comprises:
       for a specific device, determining a first point in time to change a setting of the device based on the usage pattern the device, wherein the first point in time is limited to: any of a set of predetermined points in time having a frequency with a same fixed interval between each point in time, and a point in time where the smart home system is set in the away mode;
       calculating a second point in time by adding a random offset in time to the first point in time, wherein the random offset is based on the frequency of the predetermined points in time;
       changing the setting of the device at the second point in time;

determining a stasis period during which change of the setting of the device is prevented, the stasis period being based on the usage pattern of the device; and maintaining the setting of the device for the stasis period.

12. The smart home system according to claim 11, wherein each of the plurality of devices may be of any type of the following group: light source, speaker, television, and/or blind.

13. The smart home system according to claim 11, wherein one or more of the plurality of devices are excluded from the independent control of a setting by the control circuit based on a recent change in usage pattern of said one or more of the plurality of devices.

14. The smart home system according to claim 11, wherein the control circuitry is further configured to execute a monitor function configured to:

upon the server being in the home mode, independently monitor the setting of each of the plurality of devices; and store data relating to the usage pattern of the respective device in the database based on the independently monitored setting of the corresponding device.

15. The smart home system according to claim 11, wherein one or more subsections of the plurality of devices are created according to usage pattern or a location of the devices, wherein the setting of each of the devices of each subsection are codependently controlled by the control circuit.

* * * * *